(12) United States Patent
El Khoury

(10) Patent No.: US 10,214,105 B2
(45) Date of Patent: Feb. 26, 2019

(54) MAN-MACHINE INTERFACE FOR MOTOR VEHICLE

(71) Applicant: Valeo Etudes Electroniques, Créteil (FR)

(72) Inventor: Ziad El Khoury, Antony (FR)

(*) Notice: Subject to any disclaimer, the term of this patent is extended or adjusted under 35 U.S.C. 154(b) by 0 days.

(21) Appl. No.: 14/362,215

(22) PCT Filed: Dec. 7, 2012

(86) PCT No.: PCT/FR2012/000508
§ 371 (c)(1),
(2) Date: Jun. 2, 2014

(87) PCT Pub. No.: WO2013/083888
PCT Pub. Date: Jun. 13, 2013

(65) Prior Publication Data
US 2014/0347303 A1    Nov. 27, 2014

(30) Foreign Application Priority Data

Dec. 9, 2011 (FR) .................................... 11 03784

(51) Int. Cl.
*B60K 35/00* (2006.01)
*B60K 37/06* (2006.01)
(Continued)

(52) U.S. Cl.
CPC .............. *B60K 35/00* (2013.01); *B60K 37/06* (2013.01); *G02B 5/02* (2013.01); *G02B 26/10* (2013.01); *G02B 27/01* (2013.01); *G02B 27/0101* (2013.01); *G06F 3/02* (2013.01); *G06F 3/041* (2013.01); *B60K 2350/102* (2013.01); *B60K 2350/104* (2013.01);
(Continued)

(58) Field of Classification Search
CPC .... G02B 27/01; G02B 27/0101; B60K 37/00; B60K 37/02; B60K 37/04; B60K 35/00
See application file for complete search history.

(56) References Cited

U.S. PATENT DOCUMENTS 6,663,252 B1 * 12/2003 Fong ...................... B60K 37/02
116/48
2005/0140929 A1 * 6/2005 Nambudiri et al. ............ 353/31
(Continued)

FOREIGN PATENT DOCUMENTS

DE    10 2007 058 795 A1    6/2009
EP        2 199 890 A1    6/2010
(Continued)

OTHER PUBLICATIONS

International Search Report for corresponding International Application No. PCT/FR2012/000508, dated Feb. 26, 2013 (3 pages).

*Primary Examiner* — Michael A Faragalla
*Assistant Examiner* — Chayce R Bibbee
(74) *Attorney, Agent, or Firm* — Osha Liang LLP

(57) ABSTRACT

Man-machine interface for motor vehicle comprising a display screen (6) and a control means on which the user of the vehicle can act in order to alter a parameter of the vehicle, characterized in that it also comprises displaying means (16) and a laser projector (14), the displaying means being designed to receive an image from the laser projector and to display it on the display screen.

16 Claims, 2 Drawing Sheets

(51) Int. Cl.
  *G02B 27/01*  (2006.01)
  *G02B 5/02*   (2006.01)
  *G02B 26/10*  (2006.01)
  *G06F 3/02*   (2006.01)
  *G06F 3/041*  (2006.01)

(52) U.S. Cl.
  CPC ............. *B60K 2350/1028* (2013.01); *B60K 2350/1032* (2013.01); *B60K 2350/2047* (2013.01); *B60K 2350/2052* (2013.01); *B60K 2350/2056* (2013.01); *G02B 2027/014* (2013.01)

(56) References Cited

U.S. PATENT DOCUMENTS

| | | | |
|---|---|---|---|
| 2006/0181399 A1* | 8/2006 | Sumiya | 340/461 |
| 2007/0103747 A1* | 5/2007 | Powell | G02B 13/22 359/13 |
| 2010/0253918 A1* | 10/2010 | Seder et al. | 353/13 |
| 2011/0249197 A1* | 10/2011 | Sprowl | G02B 27/0905 348/744 |
| 2012/0019781 A1* | 1/2012 | Kuhlman et al. | 353/13 |

FOREIGN PATENT DOCUMENTS

| | | |
|---|---|---|
| FR | 2 943 151 A1 | 9/2010 |
| WO | 2011/036788 A1 | 3/2011 |

\* cited by examiner

MAN-MACHINE INTERFACE FOR MOTOR VEHICLE

The present invention relates to a man-machine interface for a motor vehicle, of the type comprising a screen and a control means, on which a user of the vehicle can act in order to modify a parameter of the vehicle.

It is known to equip motor vehicles with man-machine interfaces making it possible to control equipment such as air conditioning and/or a radio and to obtain knowledge of information displayed on a multifunctional screen, relating for example to a multimedia player or to a satellite positioning assistance.

Document FR2943151 describes an example of such a man-machine interface. In this document, the screen used is provided with driven active elements such as an LCD (Liquid-Crystal Display) screen provided with liquid-crystal segments, or a TFT (Thin Film Transistor) screen provided with pixels.

However, the use of this type of screen imposes constraints associated with the style of the screen, which must necessarily be flat.

The object of the present invention is therefore to provide a man-machine interface provided with a multifunctional screen, which is improved in comparison with those of the prior art.

To this end, the invention relates to a man-machine interface for a motor vehicle, said interface comprising a viewing screen and a control means, on which a user of the vehicle can act in order to modify a parameter of the vehicle. According to the invention, this interface also comprises display means and a laser projector, the display means being arranged in order to receive and display an image coming from the laser projector on the viewing screen.

Thus, the present invention makes it possible to provide a man-machine interface comprising a multifunctional screen with reduced cost and not involving thermal restraints or screen style constraints. Remarkably, by virtue of the use of the laser projector, better optical performance is obtained, particularly in terms of brightness and contrast of the image on the viewing screen.

Advantageously, the display means comprise:
a diffuser screen on which an intermediate image is formed from the projection of the image onto said diffuser screen by the laser projector; and
a three-dimensional mirror for deforming the intermediate image in order to adapt it to the viewing screen.

The three-dimensional mirror is a curved mirror making it possible to reflect and expand the intermediate image coming from the diffuser screen, so that this image appears without deformation on the viewing screen.

By way of example, the diffuser screen is an exit pupil expander.

This type of screen makes it possible to have large image perception with the aid of a wide exit pupil.

Preferably, the three-dimensional mirror is a mirror having a freeform reflection surface. Such a surface has a complex nonplanar shape.

This makes it possible to have great freedom of adjustment for the mirror in order to adapt the image to the viewing screen.

The three-dimensional mirror is preferably produced by depositing the at least one reflective layer on a support, in particular one made of polycarbonate. The deposition of reflective layers is, for example, carried out by chemical vapor deposition.

This makes it possible to have a solid mirror with good reflection performance, the manufacture of which remains at a moderate cost.

Advantageously, the laser projector comprises:
three laser sources, each of the three sources being capable of emitting a monochromatic light beam, preferably red, green or blue; and
a scanning device comprising at least one microelectromechanical system mirror, referred to as a MEMS mirror.

The use of three laser sources driven independently in power and intensity makes it possible to obtain the desired intensity and color.

A MEMS mirror is a mirror of microelectronic size, the surface area of which is less than 1 $mm^2$. In a preferred embodiment, the MEMS mirror is mounted on two axes so as to carry out a scan on the diffuser screen in order to form the image on this screen. The scan frequency is preferably selected to be greater than or equal to 60 Hz.

This scan makes it possible to obtain a high-resolution image.

The laser sources preferably consist of laser diodes, which have the advantage of being compact.

Advantageously, the control means comprises a touch screen arranged on the viewing screen. It is then possible to act ergonomically on a parameter of the vehicle, since the detection of the action desired by the user is carried out by simple contact. The touch screen may furthermore be superposed on the viewing screen. In such a case, the touch screen is transparent.

According to a particular embodiment, the control means comprises a pushbutton or rotary button integral with the interface.

The pushbutton or rotary button is preferably supported by the viewing screen. In other words, the control means is implemented by a part of the viewing screen where the touch screen and/or at least one pushbutton and/or at least one rotary button are installed.

This makes it possible to have an entirely smooth front of the interface. The overall esthetics of the interface are thus greatly improved.

According to one embodiment, the viewing screen has a curved surface, this surface being the one through which the image to be projected and visible to the user of the vehicle passes.

Such a screen shape makes it possible to facilitate its integration into the passenger compartment of the vehicle, since the curvature of the screen can be adapted to a curvature of the dashboard or central console which receives this screen.

Preferably, the viewing screen has a frosted appearance. This makes it possible to avoid a phenomenon of reflection of the rays external to the interface, which rays may be capable of dazzling the user of the vehicle. This frosted appearance also improves the quality of the projection of the image onto the screen.

Advantageously, the man-machine interface comprises means for driving the laser projector.

These means may consist of a printed circuit board on which components making it possible, in particular, to transmit the data of the image to be projected to the laser projector, are integrated.

Also advantageously, the man-machine interface is provided with a cover.

This cover covers all of the interface outside the front face of the viewing screen. In other words, this cover covers the technical face of the interface in order, on the one hand, to protect the internal components of the interface and, on the other hand, to ensure visual homogeneity when the man-machine interface according to the invention is inactive.

This cover preferably has a black background, so that the viewing screen has a black appearance when it is deactivated.

Advantageously, the thickness of the interface is less than 100 mm.

The man-machine interface thus has a small thickness, which is particularly advantageous for its integration into a dashboard of a motor vehicle. This small thickness is obtained by virtue of the use of the freeform three-dimensional mirror. Remarkably, a suitable arrangement of the various means of the interface makes it possible to obtain a thickness less than 20 mm at the peripheral edges of the man-machine interface, thus contributing to subjective perception of a very small thickness of the man-machine interface.

Other characteristics, details and advantages of the invention will emerge more clearly on reading the description given below by way of indication with reference to the appended drawings, in which:

FIG. 1 represents a man-machine interface 2 intended to be integrated into a dashboard or a central console of a motor vehicle.

Figure 1:
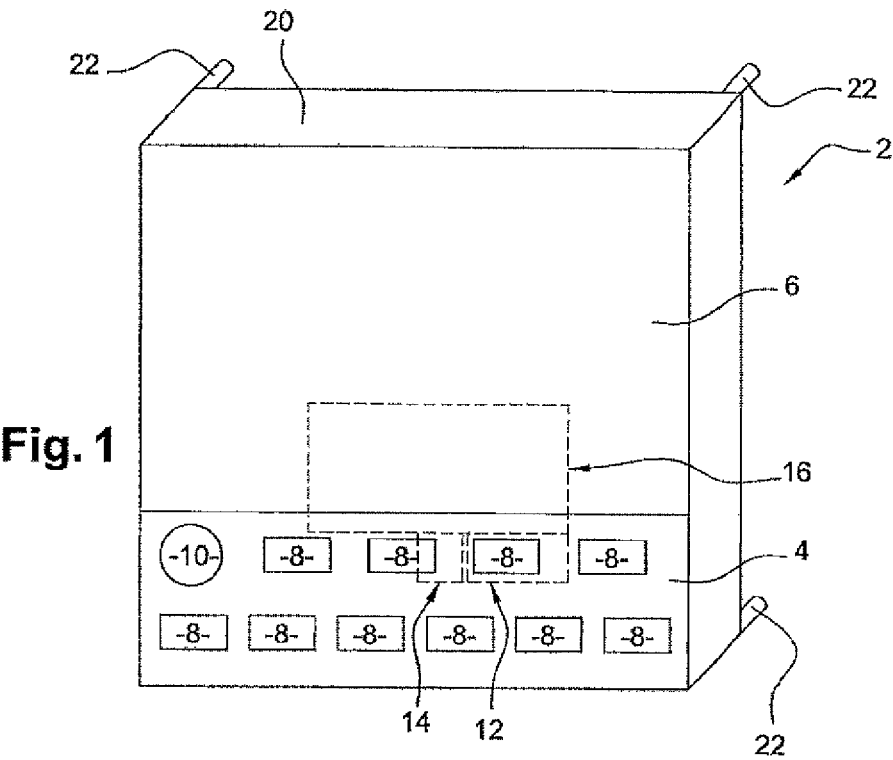
FIG. 1 represents a man-machine interface seen from the front, that is to say from the passenger compartment of the vehicle, according to one embodiment of the invention.

The man-machine interface 2 comprises a control panel 4 and a viewing screen 6, which are provided on at least one support. This support is preferably a single support, such that the viewing screen 6 extends to the control panel 4 so that the man-machine interface 2 has an entirely smooth front. Alternatively, the control panel may be a subassembly separate from the viewing screen and added onto the latter in order to form the interface according to the invention. In such a situation, it is advantageous for a first plane, passing through the visible face of the control panel, to coincide with a second plane which passes through the visible face of the viewing screen 6.

The control panel 4 comprises a plurality of pushbuttons, denoted by the reference 8, as well as at least a rotary button, or knob, 10. The buttons 8, 10 can allow a user of the vehicle to transmit commands to an electronics board (not represented) in order to act on the operation of one or more equipment items of the vehicle, such as a satellite positioning device, a radio, air conditioning, a telephone, an Internet connection, etc. The pushbuttons 8 are preferably flush-fitted in the control panel 4, so that their plane on which the user presses coincides with the plane of the viewing screen 6.

The buttons 8, 10 thus constitute a control means on which the user can act in order to modify a parameter of the vehicle.

An electronics board 24 (FIG. 2) comprises a processor which manages the operation of the control panel 4, in particular its connections to the controlled equipment located outside the man-machine interface 2 via a connector 12 located at the back of the interface (represented by dashes) and making it possible, for example, to transmit signals via a multiplexed network of the vehicle, of the CAN or LIN type.

Such an electronics board 24 also forms a mechanical support of the control panel 4, and more particularly of the at least one pushbutton and/or the at least one rotary button.

The viewing screen 6 is a multifunctional screen covered with a touch screen, for example of resistive, capacitive or acoustic technology, so that a function displayed on the viewing screen 6 can be activated/deactivated by contact with a screen zone dedicated to this function. This touch screen also constitutes a control means on which the user can act in order to modify a parameter of the vehicle. Thus, in general, the control means of the man-machine interface 2 comprises the touch screen and/or at least one pushbutton 8 and/or at least one rotary button 10.

The viewing screen 6 may have any desired style. More particularly, the viewing screen 6 is not necessarily flat but may have a curved surface, giving it a rounded appearance, the use of the display means and of the laser projector which are detailed below facilitating the use of a rounded screen because the display means are capable of adapting the image to the curved shape of the viewing screen 6.

According to the invention, the information or images displayed on the viewing screen 6 come from a laser projector 14 and pass via the display means 16 located at the back of the viewing screen 6.

The viewing screen 6 may be made of glass, or alternatively of polycarbonate or of a similar plastic material, so long as it is transparent. It has a frosted appearance for projection purposes and for antireflection reasons.

A cover 20, preferably a black cover, covers all of the components of the man-machine interface 2 located behind the viewing screen 6 and/or behind the control panel 4, in order to form a single unit which can be integrated into the dashboard or the central console by simple insertion then fastening by means of tabs 22. The cover 20 thus closes the technical zone, that is to say the rear zone of the viewing screen 6 and of the control panel 4, so as to cover all the constituent elements of the man-machine interface 2, apart from the front face of the viewing screen 6. The viewing screen 6 thus has a black appearance when it is deactivated.

The detailed structure and operation of the man-machine interface 2 will now be described with reference to FIGS. 2 and 3.

Figure 2:
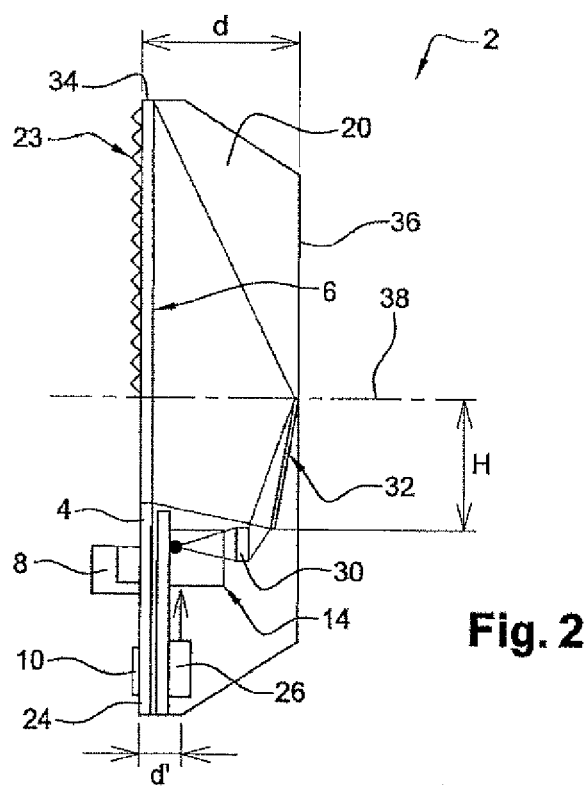
FIG. 2 is a diagram illustrating the structure and operation of the man-machine interface of FIG. 1.

Referring to FIG. 2, the viewing screen 6 is in this case covered with a covering 23, aiming to isolate the passenger compartment for esthetic and technical reasons, such as protection against dust and possible projections. This covering 23 preferably has antireflection, polarizing, etc. properties. It may also comprise screen-printed ink in order to produce masking zones, for example.

Furthermore, the man-machine interface 2 comprises the printed circuit board 24, which has a video card function. This video card 24 comprises a microcontroller 26 for driving the laser projector 14. This microcontroller 26 controls the power supply of the laser projector 14 and transmits data of a video image to be projected onto the viewing screen 6 to it.

After an optical treatment detailed with reference to FIG. 3, the laser projector 14 projects an intermediate image onto a diffuser screen 30 included in the display means 16. This intermediate image may have a certain deformation.

The diffuser screen 30 is a projection screen, here selected to be of the exit pupil expander type. It is made, for example, of frosted glass.

Further to the diffuser screen 30, the display means 16 comprise a freeform three-dimensional mirror 32. The three-dimensional mirror 32, which is for example polygonal, reflects and adapts the intermediate image coming from the diffuser screen 30 so that this is projected without deformation onto the entire surface of the viewing screen 6.

The three-dimensional mirror 32 is produced on a polycarbonate support on which the reflective layers are deposited, for example by CVD (chemical vapor deposition).

According to the embodiment represented in FIG. 2, the video card 24 is arranged behind the control panel 4 in order to support the buttons 8, 10. Furthermore, the three-dimensional mirror 32 is arranged at the bottom of the cover 20 and the diffuser screen 30 is interposed between the video card 24 and the bottom of the cover 20.

Remarkably, by virtue of this arrangement of the display means and the use of the freeform mirror 32, the optical transmission sequence from the laser projector 14 to the viewing screen 6 is carried out in a reduced volume, the thickness of the man-machine interface 2 defined by the distance d between a plane 34 tangent to the viewing screen 6 and a rear face 36 of the cover 20 being less than 100 mm, preferably equal to 50 mm. The position of the rear face 36 of the cover 20 is conditioned by the angle of inclination of the three-dimensional mirror 32 with respect to a vertical axis. It is the end of the mirror 32 opposite the laser projector 14 with respect to the mirror 32 which conditions the distance d. Such a distance is kept less than 100 mm when a height H, corresponding to the projection of the mirror 32 onto the vertical axis, is between 15 and 50 mm and the angle of inclination of the mirror 32 with respect to the vertical axis is between 5 and 20°.

Furthermore, by arranging the three-dimensional mirror 32 in the vicinity of the median plane 38 of the front face of the man-machine interface 2, it is possible to have a thickness d' of less than 20 mm on the front edges of the man-machine interface 2.

Advantageously, this arrangement of the three-dimensional mirror 32 makes it possible to avoid reflecting external light toward the viewing screen 6 when the man-machine interface 2 is deactivated. This ensures the black appearance of the viewing screen 6 when it is inactive.

Figure 3:
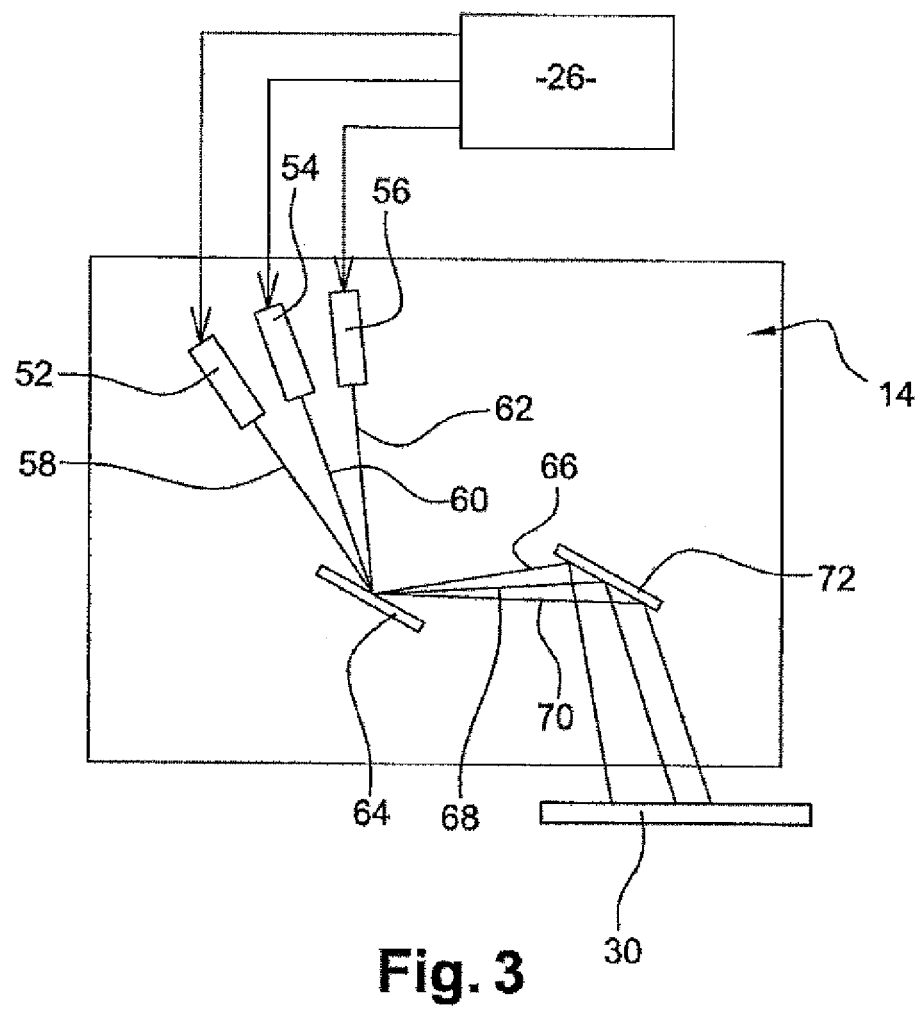
FIG. 3 is a diagram illustrating the structure and operation of the laser projector used in the man-machine interface, according to one embodiment of the invention.

The structure of the laser projector 14 is detailed in the rest of the description with reference to FIG. 3.

The laser projector 14 comprises three laser sources 52, 54, 56, typically laser diodes, each source emitting a light ray 58, 60, 62 consisting of a single color, for example red, green or blue (RGB). The power and the intensity of each of the sources is driven, independently of the other sources, by the microcontroller 26 in order to obtain the desired color and intensity of the image.

The light rays 58, 60, 62 are reflected on a semireflective mirror 64 in order to form red-green-blue (RGB) composite light rays 66, 68, 70.

The composite rays 66, 68, 70 are reflected on a microelectromechanical system MEMS scanning mirror 72. The MEMS mirror 72 has a surface area of less than 1 mm².

The MEMS mirror 72 is capable of turning about two rotation axes in order to carry out a scan, for example at a frequency of 60 Hz, of the diffuser screen 30 in order to form the intermediate image on this screen 30.

Protective means are advantageously provided, for example at the microcontroller 26, in order to cut the power supply of the laser sources 52, 54, 56 in the event that the operation of the MEMS mirror 72 stops.

Of course, other embodiments may also be envisioned.

The invention claimed is:

1. A man-machine interface for a motor vehicle, said interface comprising:

a viewing screen and a control means, on which a user of the vehicle can act in order to modify a parameter of the vehicle;

display means and a laser projector, the display means being arranged in order to receive and display an image coming from the laser projector on the viewing screen, wherein the laser projector comprises:

three laser sources, each of the three sources being capable of emitting a monochromatic light beam of one of red, green or blue; and a scanning device comprising at least one microelectromechanical system (MEMS) mirror, wherein the at least one MEMS mirror turns about two rotation axes to carry out a scan;

wherein the display means comprise a diffuser screen of the exit pupil expander type, on which an intermediate image is formed from the projection of the image onto said diffuser screen by the laser projector; and a three-dimensional mirror for deforming the intermediate image in order to adapt the intermediate image to the viewing screen, wherein the three-dimensional mirror is a curved polygonal mirror, wherein the interface is provided with a cover, the cover comprising a covering on the viewing screen, and wherein the cover closes the display means, the laser projector, and the three-dimensional mirror to be behind the viewing screen and the control means, and wherein a position of a rear face of the cover is conditioned by an angle of inclination of the three-dimensional mirror with respect to a vertical axis such that an end of the three-dimensional mirror limits a thickness of the man-machine interface.

2. The man-machine interface as claimed in claim 1, wherein the three-dimensional mirror has a nonplanar freeform reflection surface.

3. The man-machine interface as claimed in claim 1, wherein the control means comprises a touch screen arranged on the viewing screen.

4. The man-machine interface as claimed in claim 1, wherein the control means comprises a pushbutton or rotary button integral with the interface.

5. The man-machine interface as claimed in claim 4, wherein the pushbutton or rotary button is supported by the viewing screen.

6. The man-machine interface as claimed in claim 1, wherein the viewing screen has a curved surface.

7. The man-machine interface as claimed in claim 1, wherein the viewing screen has a frosted appearance.

8. The man-machine interface as claimed in claim 1, comprising means for driving the laser projector.

9. The man-machine interface as claimed in claim 1, wherein the thickness is less than 100 mm, wherein the thickness is defined by a distance between a plane tangent to the viewing screen and the rear face of the cover.

10. The man-machine interface as claimed in claim 1, wherein the cover comprises a screen-printed ink configured to produce masking zones.

11. The man-machine interface as claimed in claim 1, wherein the interface comprises a printed circuit board with a video card function.

12. The man-machine interface as claimed in claim 11, wherein the three-dimensional mirror is arranged at a bottom of the cover, and the diffuser screen is interposed between the video card and the bottom of the cover.

13. The man-machine interface as claimed in claim 11, wherein the video card function comprises a microcontroller configured to control a power supply of the laser projector and transmit data of the image to be projected onto the viewing screen.

14. The man-machine interface as claimed in claim 9, wherein a height, corresponding to a projection of the three-dimensional mirror onto the vertical axis, is between 15 and 50 mm and the angle of inclination is between 5 degrees and 20 degrees.

15. The man-machine interface as claimed in claim 1, wherein the cover comprises tabs configured to fasten the cover to the motor vehicle.

16. The man-machine interface as claimed in claim 1, wherein the covering on the viewing screen is anti-reflection and polarizing.

* * * * *